(12) United States Patent
Dai

(10) Patent No.: US 12,026,453 B2
(45) Date of Patent: Jul. 2, 2024

(54) ANNOTATION METHOD, RELATION EXTRACTION METHOD, STORAGE MEDIUM AND COMPUTING DEVICE

(71) Applicant: BOE TECHNOLOGY GROUP CO., LTD., Beijing (CN)

(72) Inventor: Yafei Dai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 31 days.

(21) Appl. No.: 17/435,197

(22) PCT Filed: Feb. 26, 2021

(86) PCT No.: PCT/CN2021/078145
§ 371 (c)(1),
(2) Date: Aug. 31, 2021

(87) PCT Pub. No.: WO2021/170085
PCT Pub. Date: Sep. 2, 2021

(65) Prior Publication Data
US 2022/0327280 A1    Oct. 13, 2022

(30) Foreign Application Priority Data
Feb. 27, 2020 (CN) .......................... 202010124863.5

(51) Int. Cl.
*G06F 17/00* (2019.01)
*G06F 40/169* (2020.01)
(Continued)

(52) U.S. Cl.
CPC .......... *G06F 40/169* (2020.01); *G06F 40/186* (2020.01); *G06F 40/279* (2020.01)

(58) Field of Classification Search
CPC .... G06F 40/169; G06F 30/186; G06F 40/279; G06F 40/216; G06F 40/284; Y02D 10/00
(Continued)

(56) References Cited

U.S. PATENT DOCUMENTS 10,394,864 B2 * 8/2019 Lee .......................... G06F 15/16
10,871,950 B2 * 12/2020 De Smet ............. G06F 16/9024
(Continued)

FOREIGN PATENT DOCUMENTS

CN      104933164 A    9/2015
CN      108427717 A    8/2018
(Continued)

OTHER PUBLICATIONS

Subasic, 'Building Knowledge Base through Deep Learning Relation Extraction and Wikidata', 2019 Spring Symposium on Combining ML with Knowledge Engineering (Year: 2019).*
(Continued)

*Primary Examiner* — Stephen S Hong
*Assistant Examiner* — Matthew J Ludwig
(74) *Attorney, Agent, or Firm* — HOUTTEMAN LAW LLC

(57) ABSTRACT

An annotation method, a method of relation extraction, a non-transient computer storage medium, and a computing device are provided. The annotation method includes: traversing each sentence in a text to be annotated to generate a first template and selecting the first template; traversing each sentence in the text to be annotated, based on the selected first template, to match at least one new seed; evaluating the at least one new seed having been matched; repeating the above steps until a selected condition is met, and outputting the matched correct seed and a classification relationship between a first entity and a second entity in the matched correct seed.

13 Claims, 4 Drawing Sheets

(51) Int. Cl.
*G06F 40/186* (2020.01)
*G06F 40/279* (2020.01)

(58) Field of Classification Search
USPC .......................................................... 715/230
See application file for complete search history.

(56) References Cited

U.S. PATENT DOCUMENTS

| | | | |
|---|---|---|---|
| 10,977,573 B1* | 4/2021 | Dalton | G06F 16/80 |
| 11,321,382 B2* | 5/2022 | Pankanti | H04L 9/0866 |
| 2015/0134336 A1* | 5/2015 | Huang | G06F 16/36 |
| | | | 704/254 |
| 2015/0193497 A1* | 7/2015 | Tallamy | G06N 5/022 |
| | | | 707/749 |
| 2017/0200093 A1* | 7/2017 | Motahari Nezhad | |
| | | | G06Q 10/1095 |
| 2017/0351749 A1 | 12/2017 | Quirk et al. | |
| 2018/0260860 A1* | 9/2018 | Devanathan | G06F 16/353 |
| 2019/0370007 A1* | 12/2019 | Gupta | G06F 16/3344 |
| 2020/0401938 A1* | 12/2020 | Etkin | G16H 50/30 |
| 2021/0005316 A1* | 1/2021 | Neumann | G06N 20/00 |
| 2021/0019370 A1* | 1/2021 | Andrassy | G06N 3/044 |
| 2021/0056101 A1* | 2/2021 | Chiticariu | G06F 16/2423 |
| 2021/0110278 A1* | 4/2021 | Meyerzon | G06N 20/00 |
| 2021/0191938 A1* | 6/2021 | Galitsky | G06N 5/01 |
| 2021/0365611 A1* | 11/2021 | Agrawal | G06N 20/00 |
| 2022/0269939 A1* | 8/2022 | Zhao | G06N 3/042 |

FOREIGN PATENT DOCUMENTS

| | | |
|---|---|---|
| CN | 109977391 A | 7/2019 |
| CN | 111291554 A | 6/2020 |
| WO | 2018223271 A1 | 12/2018 |

OTHER PUBLICATIONS

European Patent Office, Extended European Search Report, dated Jun. 9, 2023, application No. EP21761699.4.

* cited by examiner data annotation inputting a file to be annotated inputting a file containing the correct seeds inputting a file containing the error seeds

FIG. 2a

Please verify annotation result

309

Phenylketonuria

Urine inspection

Inspection mothod

For children with mental retardation, light skin and hair color, and increased muscle tone, it is necessary to suspect <DES>phenylketonuria</DES> to be inspected through <CHE>urinalysis</CHE>& confirmation   cancellation

FIG. 2b relation extraction inputting a name of a file for relation extraction inputting a name of a file for storing a relation extraction result

FIG. 2c relation extraction model

ANNOTATION METHOD, RELATION EXTRACTION METHOD, STORAGE MEDIUM AND COMPUTING DEVICE

CROSS-REFERENCE TO RELATED APPLICATIONS

This is a National Phase Application filed under 35 U.S.C. 371 as a national stage of PCT/CN2021/078145 filed on Feb. 26, 2021, an application claiming the priority of Chinese Patent Application No. 202010124863.5, filed on Feb. 27, 2020 in the Chinese Intellectual Property Office, the content of each of which is incorporated herein by reference in its entirety.

TECHNICAL FIELD

The present disclosure relates to the technical field of language recognition, and in particular to an annotation method, a relation extraction method, a storage medium, and a computing device.

BACKGROUND

In the field of natural language recognition technology, relation extraction is usually made based on deep learning. The premise of the deep learning is to provide a large amount of annotated data for model training. The current approach is to annotate each of sentences in a text to be annotated manually, resulting in high labor and time costs.

SUMMARY

A first aspect of the present disclosure provides an annotation method, which includes: step S1, determining a text to be annotated, a plurality of correct seeds and a plurality of error seeds, wherein each of entities in each of sentences of the text to be annotated has been marked by tags as a first entity or a second entity, and each of the plurality of correct seeds and the plurality of error seeds is an entity pair consisting of the first entity and the second entity; step S2, traversing each of the sentences of the text to be annotated based on the plurality of correct seeds to generate at least one first template, and selecting the at least one first template based on the plurality of correct seeds and the plurality of error seeds; step S3, traversing each of the sentences of the text to be annotated based on a selected first template to match at least one new seed; step S4, evaluating the at least one new seed having been matched, wherein a qualified new seed and existing correct seeds are used as the correct seeds, and an unqualified new seed and existing error seeds are used as the error seeds; step S5, replacing the correct seeds in step S2 with the correct seeds acquired in step S4 and replacing the error seeds in step S2 with the error seeds acquired in step S4, and repeating steps S2 to S4 until a selected condition is met; and step S6, outputting matched correct seeds and a classification relation between the first entity and the second entity in each of the matched correct seeds.

In some embodiments, the selecting the at least one first template based on the plurality of correct seeds and the plurality of error seeds includes: matching entity pairs in the text to be annotated by using the at least one first template; determining whether the entity pairs matched by the at least one first template are the correct seeds or the error seeds based on the plurality of correct seeds and the plurality of error seeds; determining a number of correct seeds and a number of error seeds in the entity pairs matched by the at least one first template; calculating an evaluation index of each of the at least one first template based on the number of correct seeds and the number of error seeds in the entity pairs matched by the at least one first template; and selecting the at least one first template based on the evaluation index of each of the at least one first template.

In some embodiments, the evaluation index of each of the at least one first template is calculated by the following formula:

$$\mathrm{Conf1}(Pi)=(Pip)/(Pip+Pin)$$

where Pip represents the number of correct seeds matched by the first template Pi, and Pin represents the number of error seeds matched by the first template Pi.

In some embodiments, the traversing each of the sentences of the text to be annotated based on a selected first template to match at least one new seed includes: acquiring a second template based on the sentences in the text to be annotated; calculating a similarity between the second template and the selected first template; and extracting entity pairs from the second template based on the similarity to match the at least one new seed.

In some embodiments, the similarity between the second template and the selected first template is calculated by the following formula:

$$\mathrm{Match}(Ci,Pi)=\alpha*\mathrm{Cosine}(p,q)+\beta*\mathrm{Euclidean}(p,q)+\gamma*\mathrm{Tanimoto}(p,q)$$

where Ci represents the second template acquired from the sentence where a seed T is located when acquiring the seed T by the first template Pi, p represents a list in the first template Pi consisting of a first character vectorized expression of a field before a corresponding correct seed, a second character vectorized expression of a field between the first entity and the second entity in the corresponding correct seed, and a third character vectorized expression of a field after the corresponding correct seed; and q represents a list in the second template Ci consisting of a first character vectorized expression of a field before the first entity and the second entity in a corresponding sentence, a second character vectorized expression of a field between the first entity and the second entity in the corresponding sentence, and a third character vectorized expression of a field after the first entity and the second entity in the corresponding sentence, and $\alpha$, $\beta$, and $\gamma$ are all proportional coefficients greater than 0, respectively.

In some embodiments, the evaluating at least one new seed having been matched includes: calculating an evaluation index of each new seed having been matched, based on the similarity between the second template and the selected first template and the evaluation index of the selected first template; and evaluating each new seed having been matched based on the evaluation index of the new seed.

In some embodiments, the evaluation index of each new seed is calculated by the following formula:

$$\mathrm{Conf2}(T)=1-\Pi_0^{|P|}(1-\mathrm{Conf1}(Pi)*\mathrm{Match}(Ci,Pi))$$

where T represents the new seed to be evaluated, P={Pi} representing all the first templates for generating the new seed T, Ci represents the second template acquired from the sentence where the seed T is located when acquiring the seed T by the first template Pi, Conf1 (Pi) represents the evaluation index of the first template Pi, and Match(Ci, Pi) represents the similarity between the first template Pi and the second template Ci.

In some embodiments, the selected condition includes: repeating steps S2 to S4 for a predetermined number of times, or a number of qualified correct seeds reaches a predetermined threshold.

In some embodiments, the traversing each of the sentences of the text to be annotated based on the plurality of correct seeds to generate at least one first template includes: clustering the sentences with the correct seeds in the text to be annotated; and acquiring the at least one first template based on a same type of sentences and a corresponding correct seed, wherein each of the at least one first template includes in the same type of sentences, a first character vectorized expression of a field before the corresponding correct seed, a second character vectorized expression of a field between the first entity and the second entity in the corresponding correct seed, and a third character vectorized expression of a field after the corresponding correct seed.

In some embodiments, the acquiring a second template based on the sentences in the text to be annotated includes: determining the first entity and the second entity of each sentence in the text to be annotated, and generating a second template based on the first entity and the second entity, wherein the second template includes a first character vectorized expression of a field before both the first entity and the second entity in the sentence, a second character vectorized expression of a field between the first entity and the second entity in the sentence, and a third character vectorized expression of a field after both the first entity and the second entity in the sentence.

In some embodiments, determining a text to be annotated includes: performing entity recognition on the sentences of the text to be annotated based on a medical dictionary, and marking tags at corresponding locations of the entities, wherein the tags respectively represents any one of a disease name, an inspection method, a treatment method, a symptom and a preventive measure.

In some embodiments, the first entity includes a field indicating the disease name, and the second entity includes a field indicating the inspection method, the treatment method, the symptom, or the preventive measure, and the classification relation includes a disease-inspection relation, a disease-treatment relation, a disease-symptom relation, or a disease-prevention relation.

In some embodiments, in a case where entities in each sentence in the text to be annotated include multiple first entities or multiple second entities, the sentence is copied in multiple copies, the tags for each copy mark corresponding one first entity and one second entity, and at least one of the first entity and the second entity in one copy is different from at least one of the first entity and the second entity in another copy.

A second aspect of the present disclosure provides a method of relation extraction, including: annotating a text to be annotated by using the annotation method of any one of the foregoing embodiments of the first aspect of the present disclosure; and training a deep learning model to acquiring a relationship extraction model by using at least some of the sentences in the text having been annotated.

In some embodiments, the method of relation extraction further includes: testing the relationship extraction model by a testing set consisting of at least some of the sentences, which are not used for training the deep learning model, in the text having been annotated.

In some embodiments, the deep learning model includes a learning model of a piecewise convolutional neural network combined with an adversarial tactics technique.

A third aspect of the present disclosure provides a non-transient computer storage medium storing therein instructions, wherein the instructions is configured to be executed by a processor to implement the annotation method of any one of the foregoing embodiments of the first aspect of the present disclosure or the method of relationship extraction of any one of the foregoing embodiments of the second aspect of the present disclosure.

A fourth aspect of the present disclosure provides a computing device, including a storage medium and a processor, wherein the storage medium stores therein instructions configured to be executed by the processor to implement the annotation method of any one of the foregoing embodiments of the first aspect of the present disclosure or the method of relationship extraction of any one of the foregoing embodiments of the second aspect of the present disclosure.

In some embodiments, the computing device further includes a human-computer interaction interface for a user to input an original text to be annotated, a plurality of correct seeds and a plurality of error seeds, and/or to confirm an annotation result.

BRIEF DESCRIPTION OF THE DRAWINGS

FIG. 2a is a schematic diagram of a human-computer interaction interface for inputting a text to be annotated, a correct seed and an error seed in an annotation method according to an embodiment of the present disclosure.

FIG. 2b is a schematic diagram of a human-computer interaction interface for identifying an annotation result in an annotation method according to an embodiment of the present disclosure.

FIG. 2c is a schematic diagram of a human-computer interaction interface for inputting a file for relation extraction (i.e., a file on which relation extraction is to be performed) according to an embodiment of the present disclosure.

FIG. 2e is a schematic diagram of a human-computer interaction interface for illustrating a storage interface of a relation extraction result according to an embodiment of the present disclosure.

DETAILED DESCRIPTION

In order to enable one of ordinary skill in the art to better understand technical solutions of the present disclosure, the present disclosure will be further described in detail below with reference to the accompanying drawings and exemplary embodiments.

In the present disclosure, it should be understood that terms, such as "comprising", "having" or the like, are intended to indicate the existence of features, numbers, steps, actions, components, parts or combinations thereof disclosed in the specification, and are not intended to exclude the possibility of the existence of one or more of other features, numbers, steps, actions, components, parts or combinations thereof.

It should also be noted that the embodiments in the present disclosure and the features in the embodiments can be combined with each other in a case of no conflict. The present disclosure will be described in detail below with reference to the accompanying drawings and exemplary embodiments.

Figure 1:
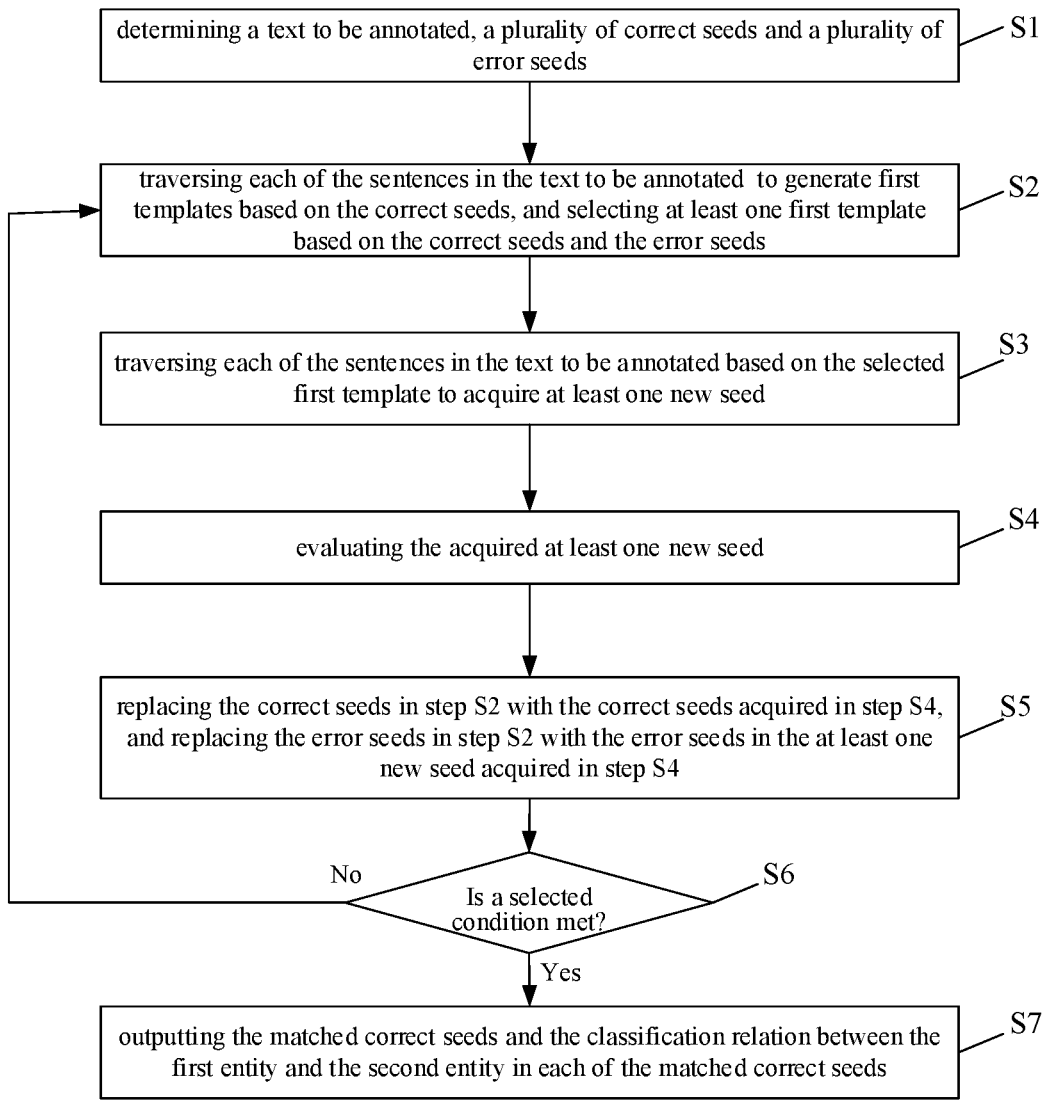
FIG. 1 is a flowchart of an annotation method according to an embodiment of the present disclosure.

Referring to FIG. 1, an embodiment of the present disclosure provides an annotation method including the following steps.

In step S1, a text to be annotated, a plurality of correct seeds and a plurality of error seeds are determined. An entity in each of sentences of the text to be annotated has been marked as a first entity or a second entity by a tag (or by a label). Each of the plurality of correct seeds and the plurality of error seeds is an entity pair consisting of a first entity and a second entity. That is, the entities in each of the sentences of the text to be annotated are first entities or second entities.

For example, the text to be annotated is unstructured text data.

For example, referring to FIG. 2a, a human-computer interaction interface may be provided for a user to input a file to be annotated, a file containing the correct seeds, and a file containing the error seeds. Alternatively, these files may also be acquired in other ways. In the following embodiments, a text of which the sentences to be annotated are medical is taken as an example.

A seed is an entity pair, or a pair of entities. A correct seed represents that there is a logical association between two entities in the correct seed. For example, a correct seed, fracture; X-ray film, indicates whether a fracture can be detected by an X-ray film. For another example, a correct seed, mediastinal tumors; esophageal barium meal radiography, indicates whether a diaphragm tumor can be detected by esophageal barium meal radiography. An error seed represents that there is no logical association between two entities in the error seed, for example, diabetes; body weight, and hypoproteinemia; blood oxygen saturation. The error seed, diabetes; body weight, indicates that the symptom of diabetes is related to body weight, which is obviously an error logical association. The error seed, hypoproteinemia; blood oxygen saturation, indicates that the symptom of hypoproteinemia is related to blood oxygen saturation, which is obviously an error logical association.

A small number of seeds (e.g., ten correct seeds and ten error seeds) are provided, more correct seeds may be acquired by automatic operation of a program, and of course, other error seeds may also be determined.

An original text to be annotated may merely include a plurality of sentences, and corresponding tags have not been marked on the entities concerned in the sentences. In this case, the tags may be marked on the entities based on a dictionary.

Specifically, entity recognition is performed on untagged sentences based on a medical dictionary, and corresponding tags are marked at locations of the entities. The tags respectively mark one of a disease name, an inspection method, a treatment method, a symptom and a preventive measure. Some of the sentences adopted in the embodiments of the present disclosure are from Baidu Encyclopedia.

Specifically, the first entity includes a field indicating the disease name, and the second entity includes a field indicating the inspection method, the treatment method, the symptom and/or the preventive measure.

A sentence in the original text is, for example: "the clinical manifestations of the disease have great variation, no deformity is unique to 18-trisomysyndrome, and therefore, the diagnosis cannot be made only based on a clinical deformity, but must be made by cell chromosome inspection, and the diagnosis shall be made based on the result of karyotype analysis &". Here, & is a programming symbol that marks the end of a sentence.

There will be many words representing the disease name and the inspection method in the medical dictionary. These words will have corresponding attribute descriptions in the medical dictionary. If a word representing the disease name is present in the sentence in the original text, the tags will be placed before and after the word to indicate that the word is the disease name, and so on.

Two entities "18-trisomysyndrome" and "cell chromosome inspection" are identified by using the medical dictionary, and the former entity is judged to be the disease name and the latter entity is judged to be the inspection method, such that corresponding positions of the sentence to be annotated are tagged. A result after the sentence is tagged is: "the clinical manifestations of the disease have great variation, no deformity is unique to <DES> 18-trisomysyndrome </DES>, and therefore, the diagnosis cannot be made only based on a clinical deformity, but must be made by <CHE> cell chromosome inspection </CHE>, and the diagnosis shall be made based on the result of karyotype analysis &".

<DES> and </DES> are specific forms of the tags, and mark a field for the disease name. Similarly, <CHE> and </CHE> are specific forms of the tags, and mark a field for the inspection method.

It should be noted that the presence of two words respectively representing the disease name and the inspection method in a sentence does not mean that the logical relation of the sentence is to introduce the inspection method of the disease, that is, a classification relation of the sentence is not necessarily a corresponding relation of disease-inspection. Therefore, subsequent steps are needed to identify whether this sentence is really talking about the inspection method of the disease.

In this case, a human-computer interaction interface may be further provided for a user to input the original text, the plurality of correct seeds and the plurality of error seeds.

In an embodiment of the present disclosure, the classification relation includes disease-inspection, disease-treatment, disease-symptom, and disease-prevention. Of course, there may be no logical relation between the entities marked by the tags in some sentences (or the logical relation is error), such that the classification relation further includes an invalid relation (NG).

It should be noted that in an embodiment of the present disclosure, each of the sentences are merely marked with one first entity and one second entity by the tags. If there are multiple (i.e., two or more) first entities or multiple second entities in a sentence, the sentence is copied in multiple copies, and different copies are marked by different tags (i.e., different positions of the sentence or different entities of the sentence are marked by tags). That is, the tags of each copy indicate one first entity and one second entity, and at least one of the first entity and the second entity is different from one copy to another copy, so as to distinguish different copies.

In step S2, each of the sentences in the text to be annotated is traversed (e.g., looked over or examined carefully) to generate a first template based on the correct seeds, and at least one first template is selected based on the correct seeds and the error seeds.

Specifically, traversing each of the sentences in the text to be annotated to generate a first template based on the correct seeds includes: clustering (e.g., grouping) the sentences in the text to be annotated that have the correct seeds; and then acquiring the first template based on a same type of sentences and a corresponding correct seed. The first template includes, in the same type of sentences, a first character vectorized expression of a field before the corresponding correct seed, a second character vectorized expression of a field between the first entity and the second entity in the corresponding correct seed, and a third character vectorized expression of a field after the corresponding correct seed.

For example, by using the seed "mediastinal tumor; esophageal barium meal radiography", a first template "tag1 may be inspected through tag2 to be diagnosed sometimes" may be generated from a sentence "<DES> mediastinal tumor </DES> may be inspected through <CHE> esophageal barium meal radiography </CHE> to be diagnosed sometimes&". In the first template, tag1 and tag2 represent the two entities in the seed, in no particular order. The vectorized expression of the field before the entity pair is vacant, the field between the entity pair is "may be inspected through" (specifically be represented as a vectorized expression), and the field after the entity pair is "to be diagnosed sometimes".

In the present disclosure, templates generated from the correct seeds are referred to as first templates. The first templates may also be understood as a list of vectorized expressions of a text. A method for vectorizing a text is not limited in the present disclosure, for example, the classic word2vector algorithm or the TF-IDF (term frequency-inverse document frequency) method may be selected for vectorized expression. For example, the vectorized expressions of the fields before, between and after an entity pair may be expressed as V1, V2, and V3, respectively, and in this case the list may be expressed as [V1, V2, V3].

If each template has a higher accuracy and a greater coverage, more new and more accurate seeds will be extracted by the template subsequently. Therefore, it is necessary to select appropriate correct seeds as initial input information based on experience, and to evaluate and select excellent seeds from the generated seeds as the correct seeds when the seeds are generated subsequently.

Selecting the at least one first template based on the correct seeds and the error seeds includes the following steps. Firstly, the at least one first template is adopted to match the entity pairs in the text to be annotated. Then, based on the correct seeds and the error seeds, it is determined whether the entity pairs matched by the at least one first template are the correct seed or the error seed. Then, the number of correct seeds and the number of error seeds in the entity pairs matched by the at least one first template are determined. Next, an evaluation index of each of the at least one first template is calculated based on the number of correct seeds and the number of error seeds in the entity pairs matched by the at least one first template. Finally, the at least one first template is selected based on the evaluation index of each of the at least one first template. If the evaluation index of each of the at least one first template is within a predetermined threshold range, the first template is selected and retained.

The evaluation index of each first template may be calculated by the following formula (1):

$$\mathrm{Confl}(Pi) = (Pip)/(Pip+Pin) \qquad (1)$$

where Pip is the number of positive examples (i.e., the number of correct seeds) matched by the first template Pi, Pin is the number of negative examples (i.e., the number of error seeds) matched by the first template Pi. Whether each seed matched by the first template Pi is a negative example may be determined by the plurality of error seeds predetermined in step S1, that is, if a new seed matches with any one of the predetermined plurality of error seeds, the new seed is a negative example, otherwise is a correct seed.

In step S3, each of the sentences in the text to be annotated is traversed based on each selected first template to acquire at least one new seed.

Specifically, traversing each of the sentences in the text to be annotated based on each selected first template to acquire at least one new seed includes the following steps. Firstly, a second template is acquired from the sentences in the text to be annotated. Then, a similarity between the second template and the selected first template is calculated. Finally, an entity pair is extract from the second template based on the similarity to acquire the at least one new seed.

Specifically, the second template may be acquired by the following method: determining the first entity and the second entity of each of the sentences in the text to be annotated, and generating the second template based on the first entity and the second entity. The second template includes a first character vectorized expression of a field before both the first entity and the second entity in the sentence, a second character vectorized expression of a field between the first entity and the second entity in the sentence, and a third character vectorized expression of a field after both the first entity and the second entity in the sentence.

The classical word2vector algorithm or TF-IDF method may be adopted to achieve each of the vectorized expressions. For example, the second template may be expressed as three parts: a left part of an entity pair, a middle part between two entities of the entity pair, and a right part of the entity pair. For example, the second template includes a first character vectorized expression of a field before both the first entity and the second entity in the sentence, a second character vectorized expression of a field between the first entity and the second entity in the sentence, and a third character vectorized expression of a field after both the first entity and the second entity in the sentence.

For example, a template is "tag1 may be inspected through tag2 to be diagnosed sometimes", and a sentence to be annotated is "<DES> disease A </DES> may be inspected through <CHE> inspection A </CHE> to be diagnosed sometimes". The disease A represents a name of a disease, and the inspection A represents a name of an inspection method. Then, the template acquired from the sentence to be annotated is also "tag1 may be inspected through tag2 to be diagnosed sometimes", and the similarity between the two templates is 100%. Of course, it is possible that the similarity between the two templates is greater than a certain threshold.

Generally, the similarity of two templates may be compared by multiplying the left parts of the two entities after being vectorized by each other, multiplying the middle parts of the two entities after being vectorized by each other, and multiplying the right parts of the two entities after being vectorized by each other. That is, the cosine formula for vector direction Cosine (p, q) is adopted to evaluate the similarity of the two templates.

Due to strong specificity of medical data, for example, sentence 1: "<DES> leiomyoma </DES> patients may be inspected to have smooth muscle cells that are long spindle-shaped or slightly corrugated and are often arranged in parallel through <CHE> histopathological inspection </CHE>&", and sentence 2: "<DES> rectal prolapse </DES> patients may be touched of the mucosa of the rectum lumen which is folded and accumulated, soft and smooth, moving up and down, with a sense of obstruction, and an annular groove being between the internal prolapsed part and the intestinal wall through <CHE> digital rectal inspection </CHE>, an embodiment of the present disclosure provides an algorithm for calculating the similarity of two templates.

Specifically, in the present disclosure, the similarity between the second template and the selected first template may be calculated by the following formula (2). Then, an entity pair is extracted from the second template based on the similarity. When the similarity between the selected first template and the second template is greater than the predetermined threshold, the entity pair is selected and retained. The similarity between the second template and the selected first template may be calculated by the following formula (2):

$$\text{Match}(Ci,Pi) = \alpha * \text{Cosine}(p,q) + \beta * \text{Euclidean}(p,q) + \gamma * \text{Tanimoto}(p,q) \quad (2)$$

where Cosine is the cosine function, Euclidean is the Euclidean distance, and Tanimoto is the similarity function of two vectors. That is, three evaluation indexes (Cosine, Euclidean and Tanimoto) are adopted to comprehensively judge the similarity between the two templates. The values of three parameters $\alpha$, $\beta$ and $\gamma$ may be selected based on experience, and some results in step S3 may be adjusted to enable the function value to be closer to the real value. Cosine, Euclidean and Tanimoto are commonly known functions in the related art.

The symbols in formula (2) are described as follows. The first template is denoted as Pi; the second template is denoted as Ci; p is a list (or a vector) consisting of the first character vectorized expression of a field before a corresponding correct seed in the first template Pi, the second character vectorized expression of a field between the first entity and the second entity in the corresponding correct seed in the first template Pi, and the third character vectorized expression of a field after the corresponding correct seed in the first template Pi; and q is a list (or a vector) consisting of the first character vectorized expression of a field before the first entity and the second entity in a corresponding sentence in the second template Ci, a second character vectorized expression of a field between the first entity and the second entity in the corresponding sentence in the second template Ci, and a third character vectorized expression of a field after the first entity and the second entity in the corresponding sentence in the second template Ci. Further, $\alpha$, $\beta$, and $\gamma$ are all proportional coefficients greater than 0.

In step S4, the acquired at least one new seed is evaluated. The qualified new seeds and the existing correct seeds are regarded as the correct seeds, and the unqualified new seeds and the existing error seeds are regarded as the error seeds.

Specifically, an evaluation index of the acquired new seed is calculated based on the similarity between the second template and the selected first template, and the evaluation index of the selected first template; and the acquired new seed is evaluated based on the evaluation index of the acquired new seed.

Specifically, the evaluation index of the new seed is calculated based on the following formula (3):

$$\text{Conf2}(T) = 1 - \Pi_0^{|P|}(1 - \text{Conf1}(Pi) * \text{Match}(Ci, Pi)) \quad (3)$$

where the seed to be evaluated is denoted as T, P={Pi} is all the first templates for generating the seed T, and Ci is a second template acquired from the sentence where the seed T is located when acquiring the seed T by the first template Pi. The second template includes a list consisting of the first character vectorized expression of the field before the first entity and the second entity in the sentence, the second character vectorized expression of the field between the first entity and the second entity in the sentence, and the third character vectorized expression of the field after the first entity and the second entity in the sentence.

Conf1(Pi) characterizes the advantages and disadvantages of the template Pi itself. Obviously, if the templates Pi themselves are more effective and the templates Pi generating the new seeds T are more similar to corresponding sentences to be annotated, the new seeds have a higher accuracy. A certain threshold may be predetermined. If an evaluation score of the Conf(T) function is higher than the certain threshold, each new seed is regarded as a qualified correct seed (i.e., a positive example); and if the evaluation score is lower than the certain threshold, each new seed is regarded as an unqualified error seed (i.e., a negative example or an error seed acquired by the first template. That is, the new seed that is matched by traversing each of the sentences in the text to be annotated by the first template may be an error seed; and if a type of the new seed is the same as a type of a predetermined error seed in step S1, then it may be determined that the new seed is an error seed.

In step S5, the correct seeds in step S2 are replaced with the correct seeds acquired in step S4, the error seeds in step S2 are replaced with the error seeds in the new seed acquired in step S4, the steps S2 to S4 are repeated, and then whether a selected condition is met is judged in step S6, for example, whether a predetermined number of times is reached or whether the number of correct seeds qualified by evaluation reaches a predetermined threshold. If the selected condition is met, the annotation method proceeds to step S7, otherwise the annotation method returns to step S2.

That is, the newly acquired correct seeds are adopted to generate new correct seeds, and the number of correct seeds increases like snowballing. Experiments show that the number of correct seeds will not increase after about 5 iterations.

In step S7, the matched correct seeds and the classification relation between the first entity and the second entity in each of the correct seeds are output.

The classification relation herein is determined by the type of the second entity in each correct seed. For example, if the second entity belongs to the inspection method classification, the type of the correct seed is of the "disease-inspection" classification, and so on.

Of course, further, the sentence(s) from which the correct seeds are acquired may be output.

Referring to FIG. 2b, a human-computer interaction interface is provided for a user to confirm the annotation results.

As mentioned above, the annotation method of the present disclosure is substantially implemented automatically by program operation, which greatly reduces the labor cost. Only a confirmed work needs to be completed manually.

Referring to Table 1, in an experimental example, in the text to be annotated, there are 10,720 sentences in which the entity pairs belong to the disease-inspection relation, 10,009 sentences in which the entity pairs belong to the disease-treatment relation, 13,045 sentences in which the entity pairs belong to the disease-symptom relation, and 11,852 sentences in which the entity pairs belong to the disease-prevention relation. Of course, if an entity pair belongs to disease-treatment relation, the logical relation of the sentence containing the entity pair is not necessarily disease-treatment relation.

TABLE 1

|  | Disease-Inspection | Disease-Treatment | Disease-Symptom | Disease-Prevention |
|---|---|---|---|---|
| Number of sentences | 10,720 | 10,009 | 13,045 | 11,852 |

The above annotation method is adopted to carry out a test, and the accuracy of annotation of different types of sentences is shown in Table 2.

TABLE 2

|  | Disease-Inspection | Disease-Treatment | Disease-Symptom | Disease-Prevention |
|---|---|---|---|---|
| Accuracy | 95% | 92% | 82% | 78% |

The embodiments of the present disclosure further provide a relation extraction method. The relation extraction method includes: annotating the text to be annotated by using the above annotation method; and at least some of the sentences in the annotated text are adopted to train a deep learning model (e.g., a PCNN+ATT model) to acquire a relation extraction model. All sentences in the text to be annotated may be used as a training set; and alternatively, a part of all the sentences may be selected as a training set and another part of all the sentences may be selected as a testing set manually.

Referring to FIG. 2c, the file for relation extraction is the file acquired by the above annotation method.

Figure 3:
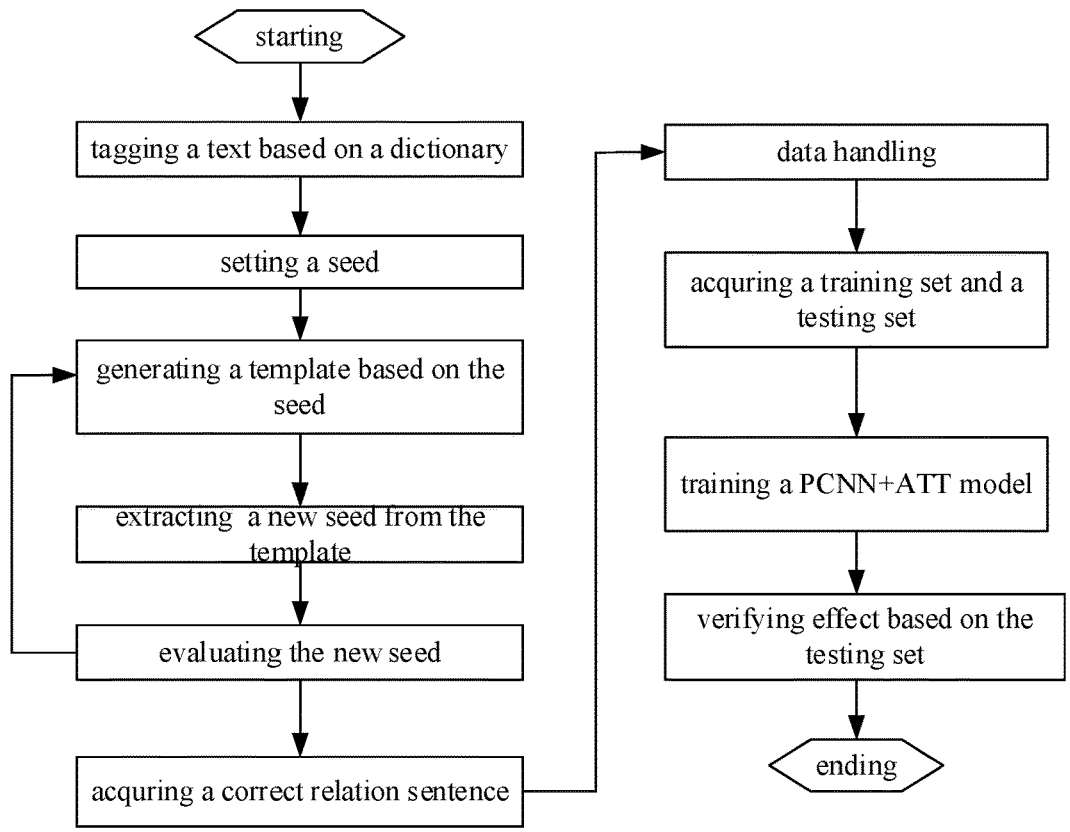
FIG. 3 is a detailed flowchart of a relation extraction method according to an embodiment of the present disclosure.

Optionally, the relation extraction method further includes taking at least some of the sentences in the annotated text that are not subjected to model training as a testing set to test the relation extraction model. That is, a part of the text acquired by the above annotation method is used for the model training and another part thereof is used for testing. FIG. 3 illustrates a complete flow of the relation extraction method, and the training set and the testing set are the sentences of different parts of the text acquired by the above annotation method, respectively.

In an experimental example, based on a method of Piecewise Convolutional Neural Networks (PCNN) of Tensorflow and Adversarial Tactics Techniques (i.e., PCNN+ATT), the sentence at the top of the ranking (i.e. the sentence with high seed score) in the text extracted by the above annotation method are acquired as the text of corresponding classification tag after being checked, and the data format thereof is sorted out (e.g., organized) in Python.

The sentence format in the training set for model training is, for example, "m.11452 m.12527 pituitary gigantism excessive growth in childhood, tall and big, fast growth of limbs/symptom pituitary gigantism is characterized by excessive growth in childhood, tall and big, and fast growth of limbs &", in which m.11452 is the character vectorized expression of pituitary gigantism, m.12527 is the character vectorized expression of excessive growth in childhood, tall and big, fast growth of limbs; pituitary gigantism is the first entity, the combination of excessive growth in childhood, tall and big, fast growth of limbs is the second entity, /symptom is the classification relation of the sentence (i.e., the sentence is a sentence describing a symptom of a disease), & is an ending symbol and meaningless.

The original sentences (i.e., the sentences without being tagged), from which the above four types of classification relations cannot be extracted by the above annotating method and which have certain interference, are classified as NA (i.e., an interference classification or an error classification), such that there are five classification relations in total. In order to check the effect of the above relationship extraction method (e.g., the accuracy of classification), experiments are carried out with 2,000 sentences in the training set and 500 sentences in the testing set (all of these sentences are annotated by the above annotation method). The results show that an AUC value is 0.9 and the accuracy is 0.94.

A receiver operating characteristic curve (a ROC curve for short) refers to a curve drawn to connect points with each other under specific stimulation conditions, with the false report probability P (y/N) acquired by a testee under different judgment criteria as the abscissa of each point and the hit probability P (y/SN) as the ordinate of each point. The area of the ROC curve is the AUC (Area Under the Curve) value with a range of [0.5, 1]. The larger the area is, the better the prediction effect of the model is.

It can be seen that the method has high feasibility and accuracy, and reduces the cost of manual annotation.

Figure 2D:
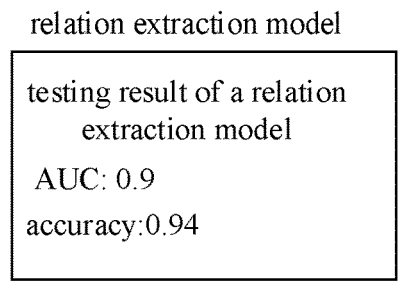
FIG. 2d is a schematic diagram of a human-computer interaction interface for illustrating a testing result of a relation extraction model according to an embodiment of the present disclosure.

Referring to FIG. 2d, the accuracy of a display test is shown. Referring to FIG. 2e, a human-computer interaction interface is shown for a user to confirm whether to store the result of relation extraction.

Python modules are encapsulated and called in the software, which is more convenient for a user to operate. Referring to FIGS. 2a to 2e, firstly, the name of the text to be annotated, the name of the file containing the correct seeds and the name of the file containing the error seeds are input, the module of marking data by using a semi-supervised method written in Python is called, and the return value is the result of data annotation. The return value, as the annotation data of the deep learning relation extraction module, is displayed in the text box, and is determined by clicking a button of confirmation after manual verification. Then, training of the model is performed, results of the testing set are returned, and a message box pops up for viewing the evaluation indexes of the model. Finally, the name of the file to be extracted is input, the name of the parameter file is input, the relation extraction may be performed by using the trained PCNN+ATT model, a message box pops up indicating whether to store the relation extraction results, and corresponding results may be stored by clicking the button of confirmation.

The annotation method of the present disclosure is described below by a specific example.

In step 1, the correct seeds A and B and the error seeds C and D are set.

In step 2, the first template is matched and formed based on the correct seeds A and B. For example, a template "tag1 may be inspected through tag2 to be diagnosed sometimes" may be generated from a sentence "<DES> mediastinal tumor </DES> may be inspected through <CHE> esophageal barium meal radiography </CHE> to be diagnosed sometimes&". For example, three first templates a, b and c may be generated in this step.

In step 3, the first templates a, b and C are evaluated (i.e., selected by calculating corresponding evaluation indices) by the above formula (1). If the template a is "tag1 may be inspected through tag2 to be diagnosed sometimes", entity pairs (i.e., seeds) A, C and D and other entity pairs are matched from all the sentences. The template a has a score of 0.33 less than a threshold such as 0.5, and the template c also has a score less than 0.5; and then the templates a and c are discarded. If the template b has a score of 0.8, then the template b will be used in the next round, that is, the template b is selected and retained.

In step 4, all sentences in the original text to be annotated are matched by the template b. If a new seed E extracted from the original text to be annotated by only the template b, and the original sentence of E is "tag1 has a pathogenesis from tag2" (the second template), the template b is "tag1 has a common pathogenesis of tag2". The similarity between the second template and the template b is calculated by the above formula (2). If the calculated similarity is not less than the threshold, the newly extracted seed E is selected and retained.

In step 5, the newly extracted seed E is evaluated by using the similarity between template b and the second template as well as the evaluation index of template b. If the similarity between the template b and the second template is 0.9, the corresponding evaluation index of the seed E is calculated by the above formula (3) as follows: $conf(T)=1-(1-0.8*0.9)=7.2$, which is larger than the a predetermined threshold such as 0.7, and the seed E is also regarded as the correct seed to extract new template together with the correct seeds A and B.

It should be noted that there is no restriction on the sequence (or order) of execution the steps described hereinthe present application, and the described sequence of the steps does not limit the solution of the present application.

The embodiments of the present disclosure further provide a non-transient (or non-transitory) computer storage medium that stores therein instructions that may be executed by a processor to implement the above annotation method or the above relation extraction method.

Figure 4:
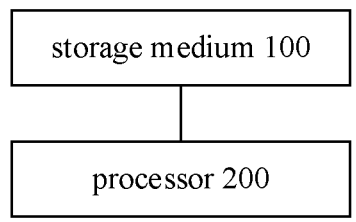
FIG. 4 is a block diagram of a computing device according to an embodiment of the present disclosure.

Referring to FIG. 4, the embodiments of the present disclosure further provide a computing device including a storage medium 100 and a processor 200. The storage medium 100 stores therein instructions that can be executed by the processor 200 to implement the above annotation method or the above relation extraction method. The computing device may further include the above human-computer interaction interfaces for a user to input an original text, a plurality of correct seeds and a plurality of error seeds, and/or confirm the annotation results. The storage medium 100 may include a non-transient computer storage medium and/or a transient computer storage medium.

The same and similar parts of each embodiment in the present application can be referred to each other. Each embodiment focuses on the differences from other embodiments. In particular, for the embodiments of devices, apparatuses and computer-readable storage medium, since they are basically similar to the method embodiments, the description thereof is simplified. For relevant parts, reference may be made to the description of corresponding parts of the method embodiments.

Each of the device, apparatus and computer-readable storage medium provided in the embodiments of the present disclosure may be in one-to-one correspondence with the method. Therefore, each of the device, apparatus and computer-readable storage medium also has beneficial technical effects similar to the corresponding method. Since the beneficial technical effects of the method have been described in detail above, the beneficial technical effects of each of the device, apparatus and computer-readable storage medium will not be repeated here.

One of ordinary skill in the art will appreciate that embodiments of the present disclosure may be provided as methods, systems, or computer program products. Therefore, the present disclosure may take the form of a full hardware embodiment, a full software embodiment, or an embodiment combining software and hardware embodiments. Further, the present disclosure may take the form of a computer program product implemented on one or more computer readable storage medium (including but not limited to disk memory, CD-ROM, optical memory, etc.) containing computer executable program codes.

The present disclosure is described with reference to flowcharts and/or block diagrams of methods, devices (systems), and computer program products according to embodiments of the present disclosure. It should be understood that each process and/or block in the flowchart and/or block diagram, and the combination of processes and/or blocks in the flowchart and/or block diagram can be realized by computer program instructions. These computer program instructions can be provided to a processor of a general-purpose computer, a special-purpose computer, an embedded processing machine, or other programmable data processing equipment to generate a machine, such that the instructions executed by the processor of the computer or other programmable data processing equipment implements a device that realizes the functions specified in one process or multiple processes in the flowchart and/or one block or multiple blocks in the block diagram.

These computer program instructions can also be stored in a computer-readable memory that can cause a computer or other programmable data processing equipment to operate in a specific manner, such that the instructions stored in the computer-readable memory implement an article of manufacture including an instruction device. The instruction device implements the functions specified in one process or multiple processes in the flowchart and/or one block or multiple blocks in the block diagram.

These computer program instructions can also be loaded on a computer or another programmable data processing equipment, such that a series of operation steps are executed on the computer or another programmable equipment to carry out computer-implemented processing, such that the instructions executed on the computer or another programmable equipment provide steps for implementing the functions specified in one or more processes in the flowchart and/or one block or more blocks in the block diagram.

In a typical configuration, the computing device includes one or more processors (each of which may be a CPU, MCU, microcontroller, etc.), input/output interfaces, network interfaces, and a memory.

The memory may include a non-permanent memory, a random access memory (RAM) and/or a non-volatile memory such as read-only memory (ROM) or flash memory (flash RAM), among computer-readable media. The memory is an example of computer-readable media.

Computer-readable media include permanent and non-permanent, removable and non-removable media, and information storage therein can be realized by any method or technology. The information can be computer-readable instructions, data structures, program modules, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, CD-Read Only Memory (CD- ROM), digital versatile disc (DVD) or other optical storage, magnetic cassettes, magnetic tape storage or other magnetic storage devices or any other non-transmission media can be adopted to store information that can be accessed by the computing device. In addition, although the operations of the method of the present disclosure are described in a specific order in the drawings, this does not require or imply that these operations must be performed in the specific order, or that all the operations shown must be performed to achieve the desired result. Additionally or alternatively, some of the steps may be omitted, more of the steps may be combined into one step for execution, and/or one of the steps may be decomposed into multiple steps for execution.

It should be understood that the above embodiments are merely exemplary embodiments employed to explain the principles of the present disclosure, and the present disclosure is not limited thereto. It will be apparent to one of ordinary skill in the art that various changes and modifications can be made therein without departing from the spirit and scope of the disclosure, and these changes and modifications are to be considered within the scope of the disclosure.

What is claimed is:

1. A computer-implemented annotation method, comprising:
   step S1, determining a text to be annotated, a plurality of correct seeds and a plurality of error seeds, wherein each of entities in each of sentences of the text to be annotated has been marked by tags as a first entity or a second entity, and each of the plurality of correct seeds and the plurality of error seeds is an entity pair consisting of the first entity and the second entity;
   step S2, traversing each of the sentences of the text to be annotated based on the plurality of correct seeds to generate at least one first template;
   step S3, traversing each of the sentences of the text to be annotated based on the at least one first template to match at least one new seed;
   step S4, evaluating the at least one new seed having been matched, wherein a qualified new seed is used as a correct seed;
   step S5, replacing the correct seeds in step S2 with the correct seeds acquired in step S4, and repeating steps S2 to S4 until a selected condition is met; and
   step S6, outputting matched correct seeds and a classification relation between the first entity and the second entity in each of the matched correct seeds;
   wherein the step S2 comprises selecting the at least one first template based on the plurality of correct seeds and the plurality of error seeds;
   the step S3 comprises traversing each of the sentences of the text to be annotated based on a selected first template to match at least one new seed; and
   wherein the selecting the at least one first template based on the plurality of correct seeds and the plurality of error seeds comprises:
   matching entity pairs in the text to be annotated by using the at least one first template;
   determining whether the entity pairs matched by the at least one first template are the correct seeds or the error seeds based on the plurality of correct seeds and the plurality of error seeds;
   determining a number of correct seeds and a number of error seeds in the entity pairs matched by the at least one first template;
   calculating an evaluation index of each of the at least one first template based on the number of correct seeds and the number of error seeds in the entity pairs matched by the at least one first template; and
   selecting the at least one first template based on the evaluation index of each of the at least one first template.

2. The computer-implemented annotation method of claim 1, wherein
   in the step S4, the qualified new seed and existing correct seeds are used as the correct seeds, and an unqualified new seed and existing error seeds are used as the error seeds; and
   the step S5 comprises replacing the error seeds in the step S2 with the error seeds acquired in the step S4.

3. The computer-implemented annotation method of claim 1, wherein the evaluation index of each of the at least one first template is calculated by the following formula:

$$\text{Confl}(Pi) = (Pip)/(Pip+Pin)$$

where Pip represents the number of correct seeds matched by the first template Pi, and Pin represents the number of error seeds matched by the first template Pi.

4. The computer-implemented annotation method of claim 1, wherein the traversing each of the sentences of the text to be annotated based on the at least one first template to match at least one new seed comprises:
   acquiring a second template based on the sentences in the text to be annotated;
   calculating a similarity between the second template and the selected first template; and
   extracting entity pairs from the second template based on the similarity to match the at least one new seed.

5. The computer-implemented annotation method of claim 1, wherein the selected condition comprises: repeating steps S2 to S4 for a predetermined number of times, or a number of qualified correct seeds reaches a predetermined threshold.

6. The computer-implemented annotation method of claim 1, wherein the traversing each of the sentences of the text to be annotated based on the plurality of correct seeds to generate at least one first template comprises:
   clustering the sentences with the correct seeds in the text to be annotated; and
   acquiring the at least one first template based on a same type of sentences and a corresponding correct seed, wherein each of the at least one first template comprises in the same type of sentences, a first character vectorized expression of a field before the corresponding correct seed, a second character vectorized expression of a field between the first entity and the second entity in the corresponding correct seed, and a third character vectorized expression of a field after the corresponding correct seed.

7. The computer-implemented annotation method of claim 1, wherein determining a text to be annotated comprises:
   performing entity recognition on the sentences of the text to be annotated based on a medical dictionary, and marking tags at corresponding locations of the entities, wherein the tags respectively represents any one of a disease name, an inspection method, a treatment method, a symptom and a preventive measure.

8. The computer-implemented annotation method of claim 7, wherein the first entity comprises a field indicating the disease name, and the second entity comprises a field indicating the inspection method, the treatment method, the symptom, or the preventive measure, and the classification relation comprises a disease-inspection relation, a disease-treatment relation, a disease-symptom relation, or a disease-prevention relation.

9. The computer-implemented annotation method of claim 1, wherein in a case where entities in each sentence in the text to be annotated comprise multiple first entities or multiple second entities, the sentence is copied in multiple copies, the tags for each copy mark corresponding one first entity and one second entity, and at least one of the first entity and the second entity in one copy is different from at least one of the first entity and the second entity in another copy.

10. A computer-implemented annotation method, comprising:

step S1, determining a text to be annotated, a plurality of correct seeds and a plurality of error seeds, wherein each of entities in each of sentences of the text to be annotated has been marked by tags as a first entity or a second entity, and each of the plurality of correct seeds and the plurality of error seeds is an entity pair consisting of the first entity and the second entity;

step S2, traversing each of the sentences of the text to be annotated based on the plurality of correct seeds to generate at least one first template;

step S3, traversing each of the sentences of the text to be annotated based on the at least one first template to match at least one new seed;

step S4, evaluating the at least one new seed having been matched, wherein a qualified new seed is used as a correct seed;

step S5, replacing the correct seeds in step S2 with the correct seeds acquired in step S4, and repeating steps S2 to S4 until a selected condition is met; and step S6, outputting matched correct seeds and a classification relation between the first entity and the second entity in each of the matched correct seeds;

wherein the traversing each of the sentences of the text to be annotated based on the at least one first template to match at least one new seed comprises: acquiring a second template based on the sentences in the text to be annotated; calculating a similarity between the second template and the selected first template; and extracting entity pairs from the second template based on the similarity to match the at least one new seed; and wherein the similarity between the second template and the selected first template is calculated by the following formula:

$$\text{Match}(Ci,Pi) = \alpha * \text{Cosine}(p,q) + \beta * \text{Euclidean}(p,q) + \gamma * \text{Tanimoto}(p,q)$$

where Ci represents the second template acquired from the sentence where a seed T is located when acquiring the seed T by the first template Pi, p represents a list in the first template Pi consisting of a first character vectorized expression of a field before a corresponding correct seed, a second character vectorized expression of a field between the first entity and the second entity in the corresponding correct seed, and a third character vectorized expression of a field after the corresponding correct seed; and q represents a list in the second template Ci consisting of a first character vectorized expression of a field before the first entity and the second entity in a corresponding sentence, a second character vectorized expression of a field between the first entity and the second entity in the corresponding sentence, and a third character vectorized expression of a field after the first entity and the second entity in the corresponding sentence, and $\alpha$, $\beta$, and $\gamma$ are all proportional coefficients greater than 0, respectively.

11. The computer-implemented annotation method of claim 10, wherein the evaluating at least one new seed having been matched comprises:

calculating an evaluation index of each new seed having been matched, based on the similarity between the second template and the selected first template and the evaluation index of the selected first template; and evaluating each new seed having been matched based on the evaluation index of the new seed.

12. The computer-implemented annotation method of claim 11, wherein the evaluation index of each new seed is calculated by the following formula:

$$\text{Conf2}(T) = 1 - \Pi_0^{|P|}(1 - \text{Conf1}(Pi) * \text{Match}(Ci,Pi))$$

where T represents the new seed to be evaluated, P={Pi} representing all the first templates for generating the new seed T, Ci represents the second template acquired from the sentence where the seed T is located when acquiring the seed T by the first template Pi, Conf1(Pi) represents the evaluation index of the first template Pi, and Match(Ci, Pi) represents the similarity between the first template Pi and the second template Ci.

13. A computer-implemented annotation method, comprising:

step S1, determining a text to be annotated, a plurality of correct seeds and a plurality of error seeds, wherein each of entities in each of sentences of the text to be annotated has been marked by tags as a first entity or a second entity, and each of the plurality of correct seeds and the plurality of error seeds is an entity pair consisting of the first entity and the second entity;

step S2, traversing each of the sentences of the text to be annotated based on the plurality of correct seeds to generate at least one first template;

step S3, traversing each of the sentences of the text to be annotated based on the at least one first template to match at least one new seed;

step S4, evaluating the at least one new seed having been matched, wherein a qualified new seed is used as a correct seed;

step S5, replacing the correct seeds in step S2 with the correct seeds acquired in step S4, and repeating steps S2 to S4 until a selected condition is met; and step S6, outputting matched correct seeds and a classification relation between the first entity and the second entity in each of the matched correct seeds;

wherein the traversing each of the sentences of the text to be annotated based on the at least one first template to match at least one new seed comprises: acquiring a second template based on the sentences in the text to be annotated; calculating a similarity between the second template and the selected first template; and extracting entity pairs from the second template based on the similarity to match the at least one new seed; and wherein the acquiring a second template based on the sentences in the text to be annotated comprises:

determining the first entity and the second entity of each sentence in the text to be annotated, and generating a second template based on the first entity and the second entity, wherein the second template comprises a first character vectorized expression of a field before both the first entity and the second entity in the sentence, a second character vectorized expression of a field between the first entity and the second entity in the sentence, and a third character vectorized expression of a field after both the first entity and the second entity in the sentence.

\* \* \* \* \*